United States Patent
Maruyama et al.

(10) Patent No.: US 12,252,149 B2
(45) Date of Patent: Mar. 18, 2025

(54) ALERT SYSTEM AND RECORDING MEDIUM

(71) Applicant: HONDA MOTOR CO., LTD., Tokyo (JP)

(72) Inventors: Masaki Maruyama, Wako (JP); Minoru Higuchi, Wako (JP); Yuya Kishimoto, Wako (JP); Toshiaki Seo, Wako (JP); Masuhito Tanaka, Tokyo (JP); Kazuki Takano, Tokyo (JP); Hidehiro Takeda, Tokyo (JP); Misaki Koseki, Kawasaki (JP)

(73) Assignee: HONDA MOTOR CO., LTD., Tokyo (JP)

( * ) Notice: Subject to any disclaimer, the term of this patent is extended or adjusted under 35 U.S.C. 154(b) by 266 days.

(21) Appl. No.: 17/951,466

(22) Filed: Sep. 23, 2022

(65) Prior Publication Data

US 2023/0112294 A1    Apr. 13, 2023

(30) Foreign Application Priority Data

Sep. 29, 2021    (JP) .................................. 2021-159821

(51) Int. Cl.
*B60W 50/14*        (2020.01)
*B60K 35/00*        (2024.01)
(Continued)

(52) U.S. Cl.
CPC ............ *B60W 50/14* (2013.01); *B60K 35/00* (2013.01); *B60K 35/26* (2024.01); *B60K 35/28* (2024.01); *B60K 35/29* (2024.01); *B60K 35/60* (2024.01); *B60K 35/81* (2024.01); *B60K 2360/178* (2024.01); *B60K 2360/1868* (2024.01); *B60K 2360/188* (2024.01); *B60K 2360/334* (2024.01);
(Continued)

(58) Field of Classification Search
CPC ........... B60W 50/14; B60W 2050/143; B60W 2050/146; B60K 35/00; B60K 35/26; B60K 35/28; B60K 35/29; B60K 35/60; B60K 35/81; B60K 2360/178; B60K 2360/1868; B60K 2360/188; B60K 2360/334; B60K 2360/785; B60K 35/285; B60R 1/24; G02B 27/01; G02B 27/0101; G02B 27/0179; G02B 2027/0141
See application file for complete search history.

(56) References Cited

U.S. PATENT DOCUMENTS 10,448,180 B1 * 10/2019 Helm ..................... B60K 35/22
2009/0231116 A1 * 9/2009 Takahashi ............... B60Q 9/00
340/461

(Continued)

FOREIGN PATENT DOCUMENTS

JP        2017-021546 A      1/2017

*Primary Examiner* — Adnan Aziz
(74) *Attorney, Agent, or Firm* — Rankin, Hill & Clark LLP (57) ABSTRACT

The alert system includes a projection device, a display control unit, and a target object recognition unit. When a state changes from a state where a target object is not recognized by the target object recognition unit to a state where a target object is recognized by the target object recognition unit, the display control unit causes the projection device to output an alert display on a front window such that the length of the alert display is gradually shortened toward a position where a direction from an operator to the target object intersects with a front window.

4 Claims, 10 Drawing Sheets

(51) Int. Cl.
  *B60K 35/26* (2024.01)
  *B60K 35/28* (2024.01)
  *B60K 35/29* (2024.01)
  *B60K 35/60* (2024.01)
  *B60K 35/81* (2024.01)

(52) U.S. Cl.
  CPC .. *B60K 2360/785* (2024.01); *B60W 2050/143* (2013.01); *B60W 2050/146* (2013.01)

(56) References Cited

U.S. PATENT DOCUMENTS

| | | | |
|---|---|---|---|
| 2015/0002285 A1* | 1/2015 | Hatakeyama | B60K 35/00 340/435 |
| 2016/0082840 A1* | 3/2016 | Yoshida | B60R 1/28 701/36 |
| 2018/0086346 A1* | 3/2018 | Fujisawa | B60W 50/14 |
| 2018/0198955 A1* | 7/2018 | Watanabe | G09G 3/001 |
| 2021/0023994 A1* | 1/2021 | Watanabe | B60R 1/00 |
| 2021/0114514 A1* | 4/2021 | Karol | G06N 20/00 |
| 2021/0165220 A1* | 6/2021 | Nakada | B60W 40/08 |

* cited by examiner

| NUMBER OF TARGET OBJECTS | | ZERO OR SINGLE | PLURAL |
|---|---|---|---|
| INFLUENCE DEGREE | LEVEL 0 | ALL LIT UP, WHITE | — |
| | LEVEL 1 | ALL LIT UP, WHITE | RANGE LIMITED, YELLOW |
| | LEVEL 2 | RANGE LIMITED, ORANGE | RANGE LIMITED, ORANGE |
| | LEVEL 3 | RANGE LIMITED, RED | ALL LIT UP, RED |

ALERT SYSTEM AND RECORDING MEDIUM

INCORPORATION BY REFERENCE

The present application claims priority under 35 U.S.C. § 119 to Japanese Patent Application No. 2021-159821 filed on Sep. 29, 2021. The content of the application is incorporated herein by reference in its entirety.

BACKGROUND OF THE INVENTION

Field of the Invention

The present invention relates to an alert system and a recording medium.

Description of the Related Art

Conventionally, there has been proposed an image display system for vehicle with which other vehicles traveling around own vehicle are detected by a camera or a radar, and a marking image of other vehicles are displayed on a front window by a HUD (Head Up Display) to be superimposed on the other vehicles viewed by the driver (for example, see Japanese Patent Laid-Open No. 2017-021546).

As described above, when a target object such as another vehicle present around a mobile body such as own vehicle is detected, it is desirable that the attention of the operator is promptly directed toward the target object.

An object of the present invention, which has been made in view of the aforementioned circumstances, is to provide an alert system that supports the operator to promptly pay attention to the target object and to provide a recording medium.

SUMMARY OF THE INVENTION

As a first aspect for achieving the foregoing object, there is an alert system including: a projection device configured to output, on a front window of a mobile body, a visual display viewable to an operator of the mobile body; a display control unit configured to cause the projection device to output a prescribed alert display on the front window as the visual display; and a target object recognition unit configured to recognize a target object present in front of the mobile body, in which the display control unit: when the target object is not recognized by the target object recognition unit, causes the projection device to output, on the front window, the alert display in a linear form having a prescribed length corresponding to a width of the front window along a width direction of the mobile body; and when a state changes from a state where the target object is not recognized by the target object recognition unit to a state where the target object is recognized by the target object recognition unit, causes the projection device to output the alert display on the front window such that the length of the alert display is gradually shortened toward a position where a direction from the operator to the target object intersects with the front window.

In the alert system, when the state where the target object is not recognized by the target object recognition unit continues for a prescribed time or more, the display control unit may change an output mode of the alert display formed by the projection device.

The alert system may include an influence degree recognition unit configured to recognize an influence degree of the target object for the mobile body when the target object is recognized by the target object recognition unit, in which the display control unit may set an output mode of the alert display formed by the projection device in accordance with the influence degree.

The alert system may include a sound image localization control unit configured to change a sound image position of a prescribed alert sound perceived by the operator by controlling an output mode of a plurality of speakers provided to the mobile body, in which the sound image localization control unit may: when the target object is not recognized by the target object recognition unit, set the sound image position of the alert sound to a prescribed range of surroundings of the operator; and when a state changes from a state where the target object is not recognized by the target object recognition unit to a state where the target object is recognized by the target object recognition unit, gradually reduce the range of the sound image position of the alert sound from the prescribed range toward the direction from the operator to the target object.

As a second aspect for achieving the foregoing object, there is a non-transitory recording medium storing a control program for causing a computer to execute processing of: acquiring a recognition result of a target object recognition unit that recognizes a target object present in front of a mobile body; outputting a command to a projection device to display, on a front window of the mobile body, a prescribed alert display corresponding to the recognition result as a visual display, the projection device outputting the visual display viewable to an operator of the mobile body; when the target object is not recognized by the target object recognition unit, outputting a command to the projection device to display the alert display in a linear form having a prescribed length corresponding to a width of the front window along a width direction of the mobile body; and when a state changes from a state where the target object is not recognized by the target object recognition unit to a state where the target object is recognized by the target object recognition unit, outputting a command to the projection device to display the alert display such that the length of the alert display in the linear form is gradually shortened from the prescribed length toward a position where a direction from the operator to the target object intersects with the front window.

According to the alert system, it is possible to support the operator to promptly pay attention to the target object.

DETAILED DESCRIPTION OF THE PREFERRED EMBODIMENTS

1. Configurations of Alert System and Vehicle

Figure 1:
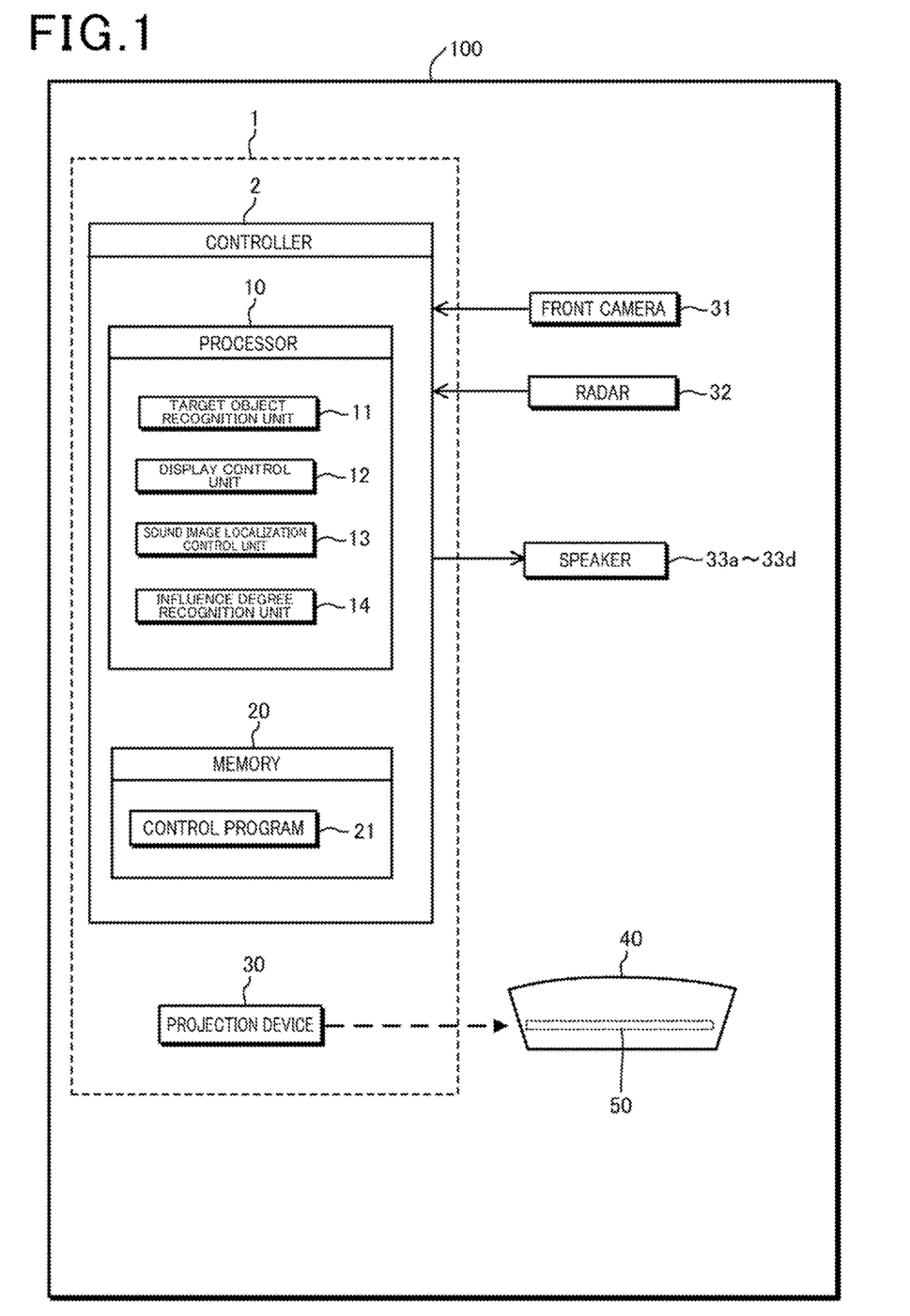
FIG. 1 is a block diagram of an alert system and a vehicle on which the alert system is loaded.

By referring to FIG. 1 to FIG. 3, configurations of a vehicle 100 and an alert system 1 loaded on the vehicle 100 will be described. The vehicle 100 corresponds to a mobile body of the present disclosure. As illustrated in FIG. 1, the alert system 1 includes a controller 2 and a projection device 30.

The controller 2 is a control unit that includes a processor 10, a memory 20, and an interface circuit or the like, not illustrated. The projection device 30 outputs, on a front window 40 of the vehicle 100, an alert display 50 that is a visual display viewable to a driver (operator) P illustrated in FIG. 2. Referring to FIG. 2 and FIG. 3, the projection device 30 is a light source array configured with a plurality of light sources disposed continuously along the width direction of the vehicle 100. The controller 2 corresponds to a computer of the present disclosure.

Each of the light sources of the projection device 30 is an LED that is capable of emitting light by switching a plurality of colors, for example. The projection device 30 is disposed on a dashboard or the like underneath the front window 40 by facing the front window 40. The projection device 30 is formed to be able to individually switch on and off states of the light sources as well as the lighting colors thereof. In the embodiment, the lighting colors of each of the light sources can be switched to white, yellow, orange, and red.

In addition to the alert system 1, the vehicle 100 also includes a front camera 31, a radar 32, and a plurality of speakers 33a to 33d. As illustrated in FIG. 2, the front camera 31 is provided at an upper part or the like of the front window 40, captures an image of the front side of the vehicle 100, and outputs the captured image to the controller 2.

Figure 2:
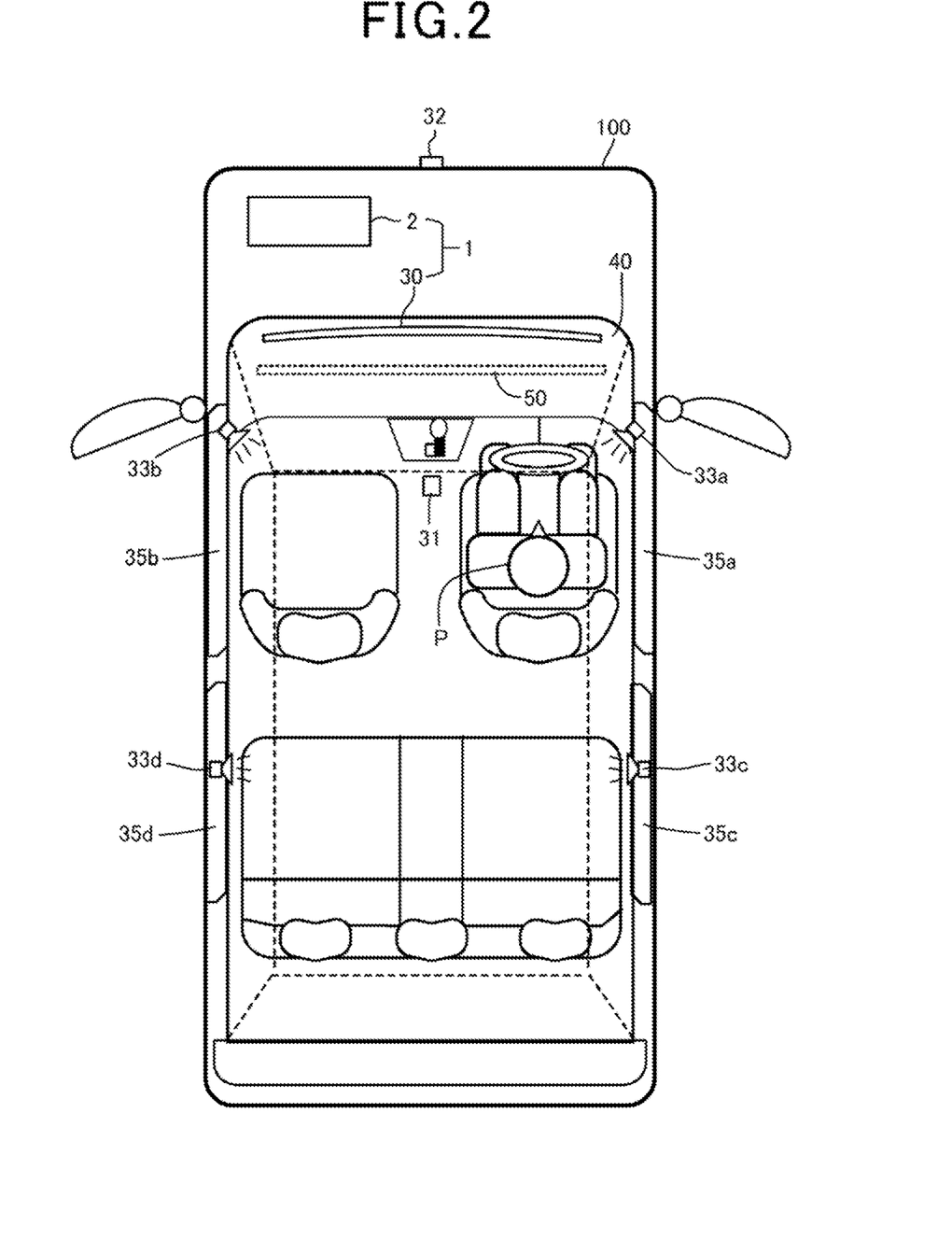
FIG. 2 is an explanatory diagram of an arrangement of a projection device and speakers in the vehicle.
Figure 3:
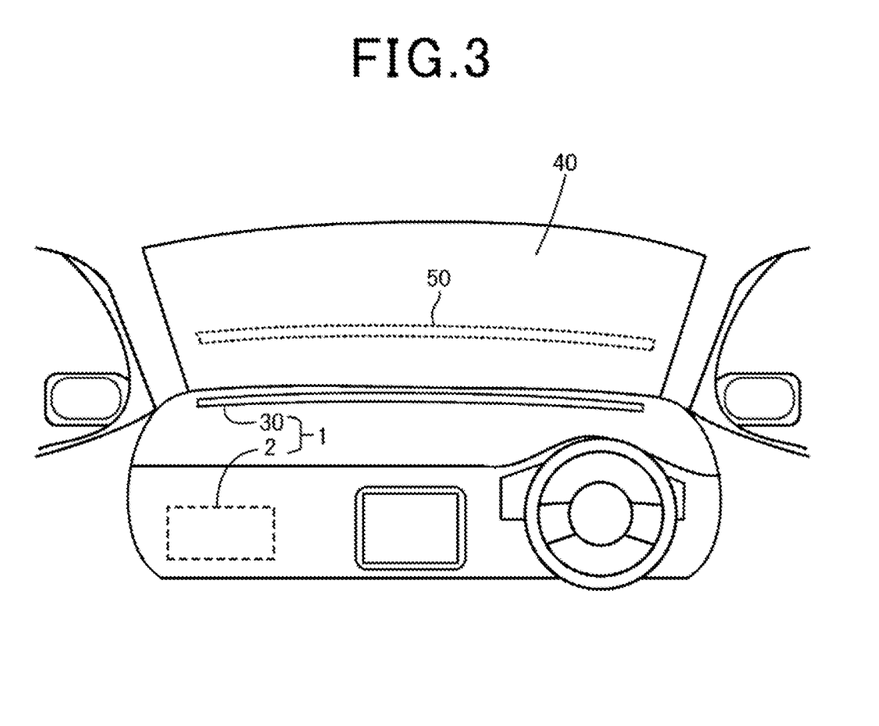
FIG. 3 is an explanatory diagram of an output mode of an alert display on a front window by the projection device.

As illustrated in FIG. 2, the radar 32 is provided in the front side of the vehicle 100, detects a position of an object present in front of the vehicle 100, and outputs a position detection signal to the controller 2. As illustrated in FIG. 2, the speakers 33a to 33d are provided, for example, at a driver's door 35a, a passenger's door 35b, a right rear door 35c, and a left rear door 35d of the vehicle 100, respectively.

The processor 10 functions as a target object recognition unit 11, a display control unit 12, a sound image localization control unit 13, and an influence degree recognition unit 14 by reading and executing a control program 21 of the alert system 1 saved in the memory 20. The control program 21 may be read out from a non-transitory recording medium (a magnetic disk, an optical disk, a flash memory, or the like) and saved in the memory 20, or may be downloaded from an external server or the like and saved in the memory 20.

The target object recognition unit 11 recognizes a target object (pedestrian, another vehicle, or the like) present in front of the vehicle 100 based on the captured image acquired by the front camera 31 and an object position detection signal from the radar 32. The display control unit 12 controls an output mode of the alert display 50 formed by the projection device 30. The sound image localization control unit 13 controls the output mode (output level, output timing, and the like) of the speakers 33a to 33d to change a sound image position of a prescribed alert sound perceived by the driver P. Note that there may simply need to be a plurality of speakers, and the number thereof may be three or less or five or more.

The influence degree recognition unit 14 recognizes the influence degree of the target object for the vehicle 100 in four stages from level 0 to level 3 according to the recognized state of the target object by the target object recognition unit 11. Note that level 0 is a state where the target object is not recognized by the target object recognition unit 11. Levels 1 to 3 correspond to the states where the target object is recognized by the target object recognition unit 11, and the influence degree recognition unit 14 recognizes the influence degree by switching it as level 1→level 2→level 3, as the distance between the target object and the vehicle 100 becomes shorter.

Note that the influence degree recognition unit 14 may recognize the influence degree by also considering the speed at which the target object is approaching the vehicle 100. In that case, the influence degree recognition unit 14 recognizes the influence degree by switching it as level 1→level 2→level 3, as the speed at which the target object is approaching the vehicle 100 becomes faster. Furthermore, the display control unit 12 sets the display mode (display color, display range) of the alert display in accordance with the influence degree of the target object according to a setting table of the alert display illustrated in FIG. 10.

2. Alert Processing

By referring to the explanatory diagrams illustrated in FIG. 7 to FIG. 10, the alert processing executed by the target object recognition unit 11, the display control unit 12, the sound image localization control unit 13, and the influence degree recognition unit 14 will be described according to the flowcharts illustrated in FIG. 4 to FIG. 6.

Figure 4:
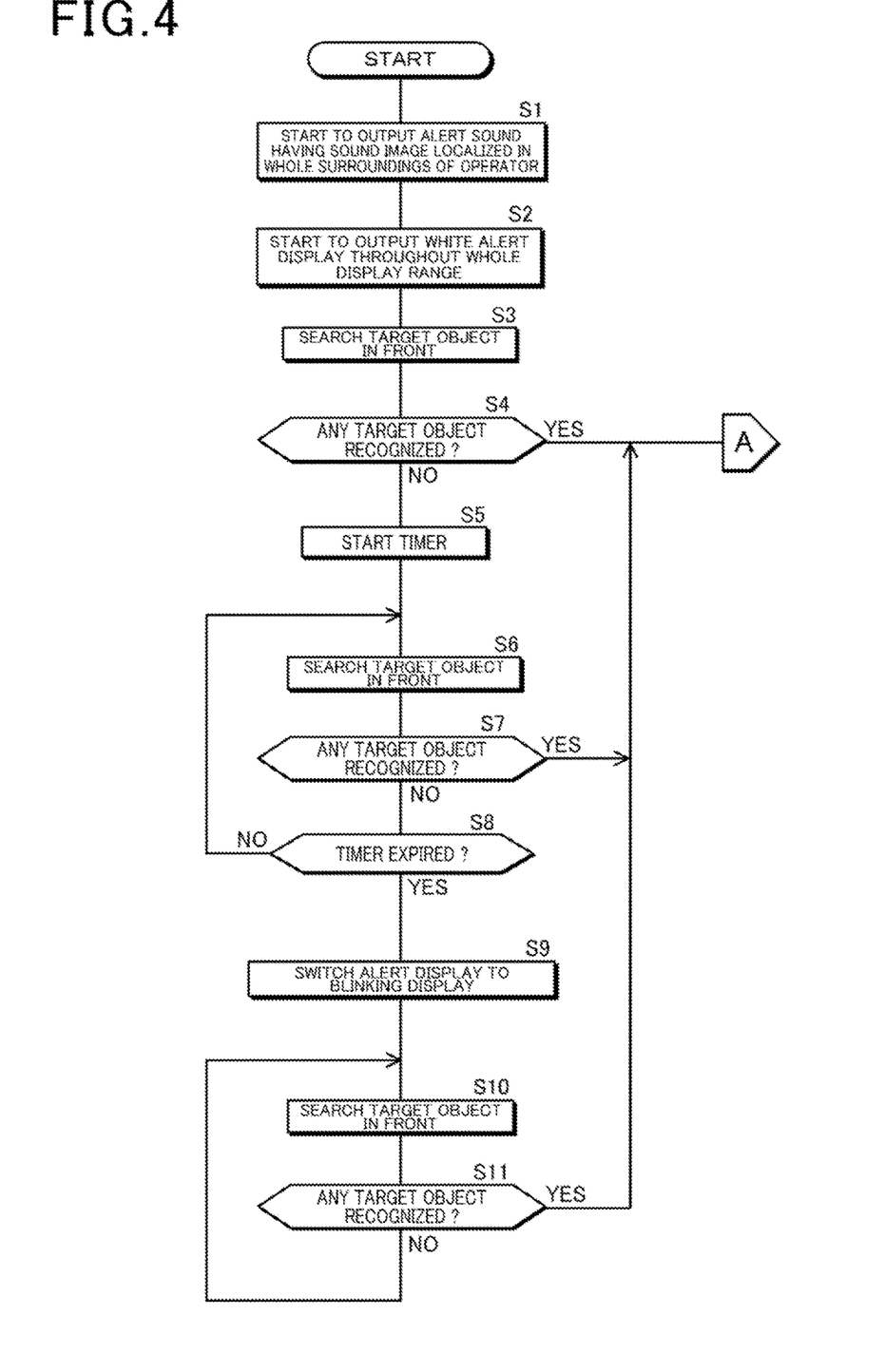
FIG. 4 is a first flowchart of alert processing.

In Step S1 of FIG. 4, the sound image localization control unit 13 starts to output an alert sound. The sound image localization control unit 13 controls the output mode of the speakers 33a to 33d such that the sound image position of the alert sound covers the whole surroundings of the driver P (corresponds to a prescribed range of the surroundings of an operator according to the present disclosure). Thereby, as illustrated in C1 of FIG. 9, a sound image position 60 of the alert sound becomes the whole surroundings of the driver P, so that the driver P can perceive the alert sound from the whole surroundings. The alert sound of such a case is set to a gentle sound giving a sense of security, which corresponds to the risk level 0.

In a following Step S2, the display control unit 12 turns on the whole light sources of the projection device 30 to start the alert display by the projection device 30. The display control unit 12 outputs the alert display 50 on the front window 40 throughout a whole display range (projection range) of the projection device 30. In that case, the controller 2 outputs a command to the projection device 30 to turn on the whole light sources. This provides a state where the alert display 50 in a linear form is displayed in almost the whole range in the vehicle width direction of the front window 40 as illustrated in A1 of FIG. 7. The alert display 50 in that case is displayed in white that corresponds to the risk level 0, thereby making it possible to encourage the driver P to pay attention in a wide range.

In a next Step S3, the target object recognition unit 11 searches a target object present in front of the vehicle 100 based on the captured image of the front camera 31 and the position detection signal acquired by the radar 32. When the target object present in front of the vehicle 100 is recognized in a following Step S4, the target object recognition unit 11 advances the processing to Step S20 of FIG. 5. In the meantime, when no target object present in front of the vehicle 100 is recognized, the target object recognition unit 11 advances the processing to Step S5.

In Step S5, the display control unit 12 starts a timer for checking continuation of the state where no target object present in front of the vehicle 100 is recognized. The set time of the timer is, for example, 3 seconds. By looping the processing of subsequent Steps S6 to S8, the target object recognition unit 11 searches the target object present in front of the vehicle 100 in Step S6 until the timer expires in Step S8. Then, in Step S7, the target object recognition unit 11 advances the processing to Step S20 of FIG. 5 when the target object present in front of the vehicle 100 is recognized, and advances the processing to Step S8 when no target object present in front of the vehicle 100 is recognized.

In Step S9, the display control unit 12 switches the alert display 50 to blinking display. The display control unit 12 provides the alert display 50 that blinks once in every several seconds, for example. This makes it possible to encourage the driver P to expand the caution range by not considering it as safe even when no target object is recognized by the target object recognition unit 11. In a next Step S10, the target object recognition unit 11 searches the target object present in front of the vehicle 100 based on the captured image of the front camera 31 and the detection signal of the radar 32. In a following Step S11, the target object recognition unit 11 advances the processing to Step S20 of FIG. 5 when the target object present in front of the vehicle 100 is recognized, and advances the processing to Step S10 when no target object present in front of the vehicle 100 is recognized.

Figure 5:
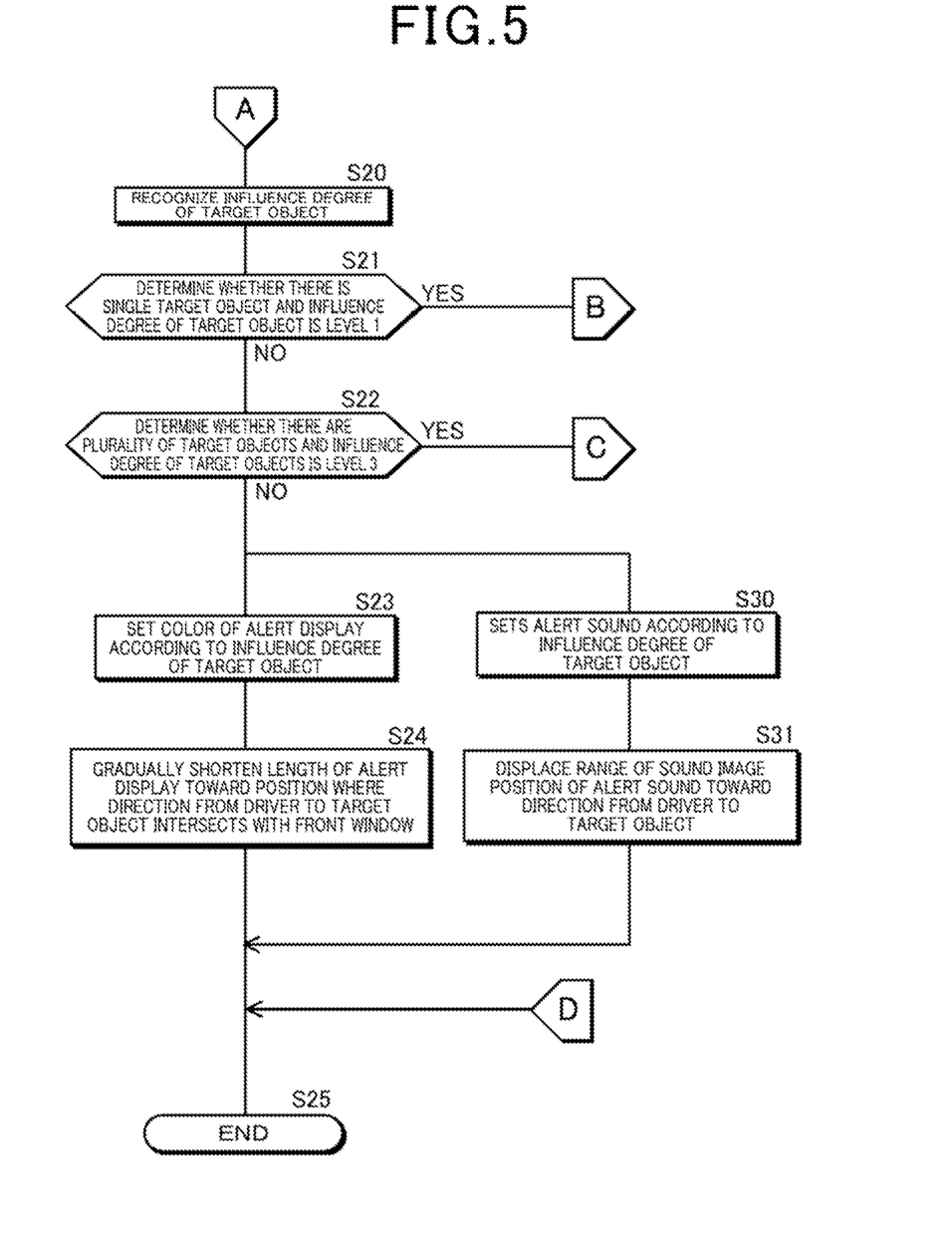
FIG. 5 is a second flowchart of the alert processing.

In Step S20 of FIG. 5, as described above, the influence degree recognition unit 14 recognizes the influence degree of the target object for the vehicle 100 in four stages from level 0 to level 3. In a next Step S21, the influence degree recognition unit 14 determines whether there is a single target object recognized by the target object recognition unit 11 and the influence degree of the target object is level 1.

Figure 6:
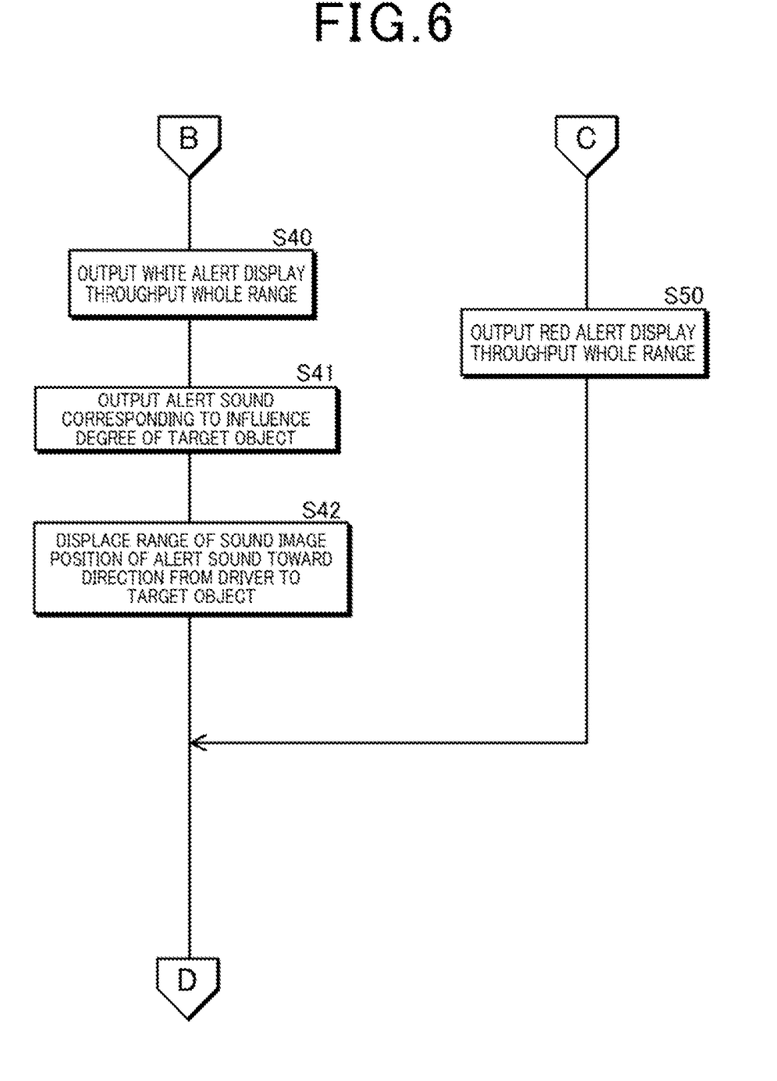
FIG. 6 is a third flowchart of the alert processing.

Then, when there is a single target object recognized by the target object recognition unit 11 and the influence degree of the target object is level 1, the influence degree recognition unit 14 advances the processing to Step S40 of FIG. 6. In the meantime, when there is a plurality of target objects recognized by the target object recognition unit 11 or the influence degree of the target object is level 2 or higher, the influence degree recognition unit 14 advances the processing to Step S22.

In Step S22, the influence degree recognition unit 14 determines whether there is a plurality of target objects recognized by the target object recognition unit 11 and the influence degree of at least one of the target objects is level 3. Then, when there is a plurality of target objects recognized by the target object recognition unit 11 and the influence degree of at least one of the target objects is level 3, the influence degree recognition unit 14 advances the processing to Step S50 of FIG. 6. In the meantime, when there is a single target object recognized by the target object recognition unit 11 or the influences degrees of all target objects are level 2 or less, the influence degree recognition unit 14 advances the processing to Step S23. In Step S23, the display control unit 12 sets the color of the alert display in accordance with the number of target objects and the level of the influence degree according to the setting table of the alert display illustrated in FIG. 10.

Figure 7:
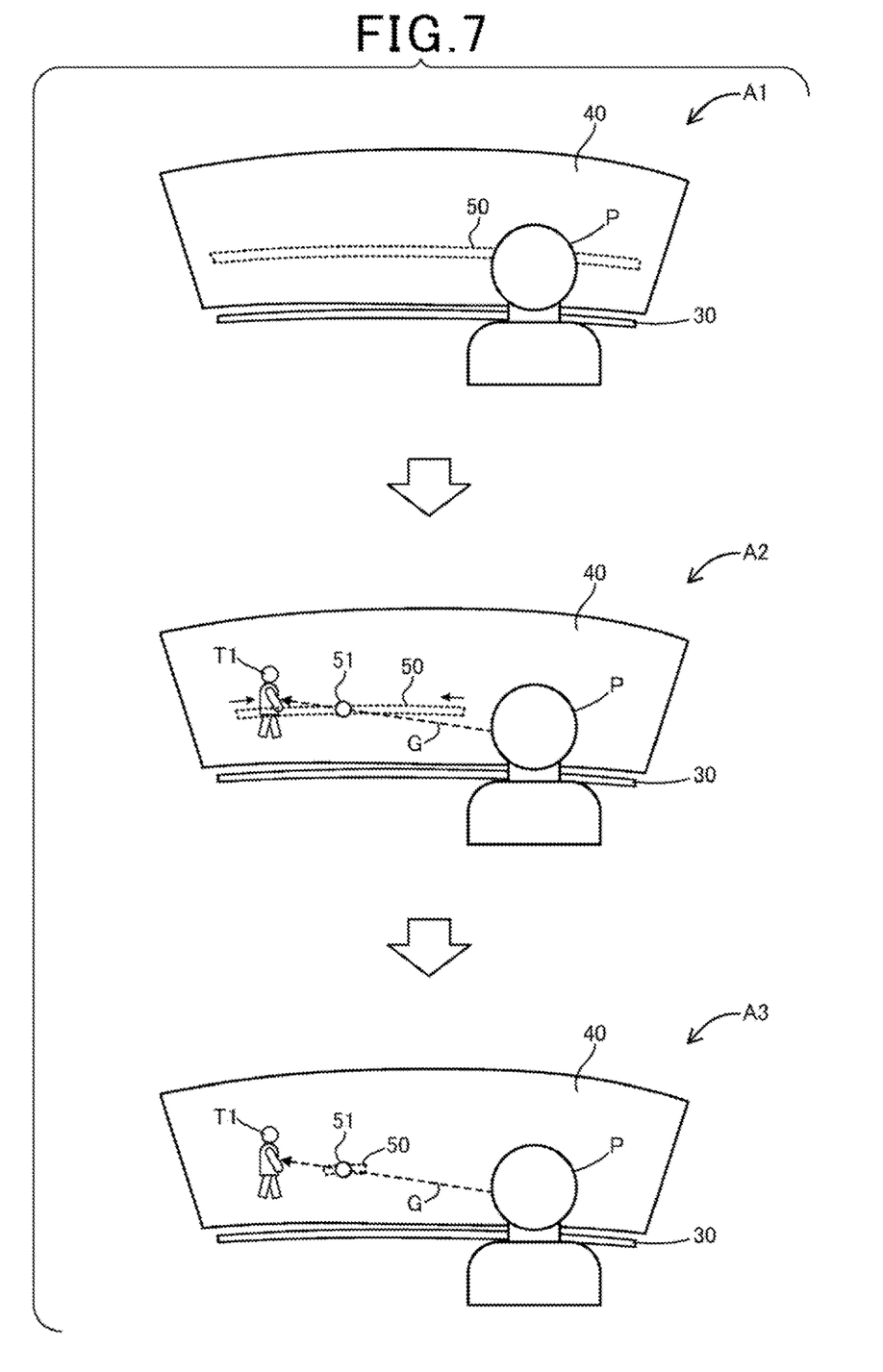
FIG. 7 is an explanatory diagram of processing for gradually shortening the length of the alert display, when a single target object present in front of the vehicle is recognized.

In a following Step S24, as illustrated in A2 and A3 of FIG. 7, the display control unit 12 gradually shortens the length of the alert display 50 toward a position 51 at which a direction G from the driver P toward a target object T1 intersects with the front window 40, and advances the processing to Step S25. In that case, the controller 2 outputs a command to the projection device 30 to turn on the light sources such that the length of the alert display 50 is gradually shortened toward the position 51. Note here that the length of the alert display 50 may be gradually shortened in a step-by-step manner or in a continuous manner. Note that A2 and A3 of FIG. 7 illustrate a state where a pedestrian is recognized as the target object T1 by the target object recognition unit 11. By gradually reducing the alert display 50 from a state where the light sources of the projection device 30 are all turned on to display the alert display 50 throughout the whole display range as illustrated in A1 of FIG. 7 toward the position 51 as illustrated in A2 and A3, it is expected to have such an effect that the line-of-sight of the driver P is guided to the direction G toward the target object T1.

Figure 8:
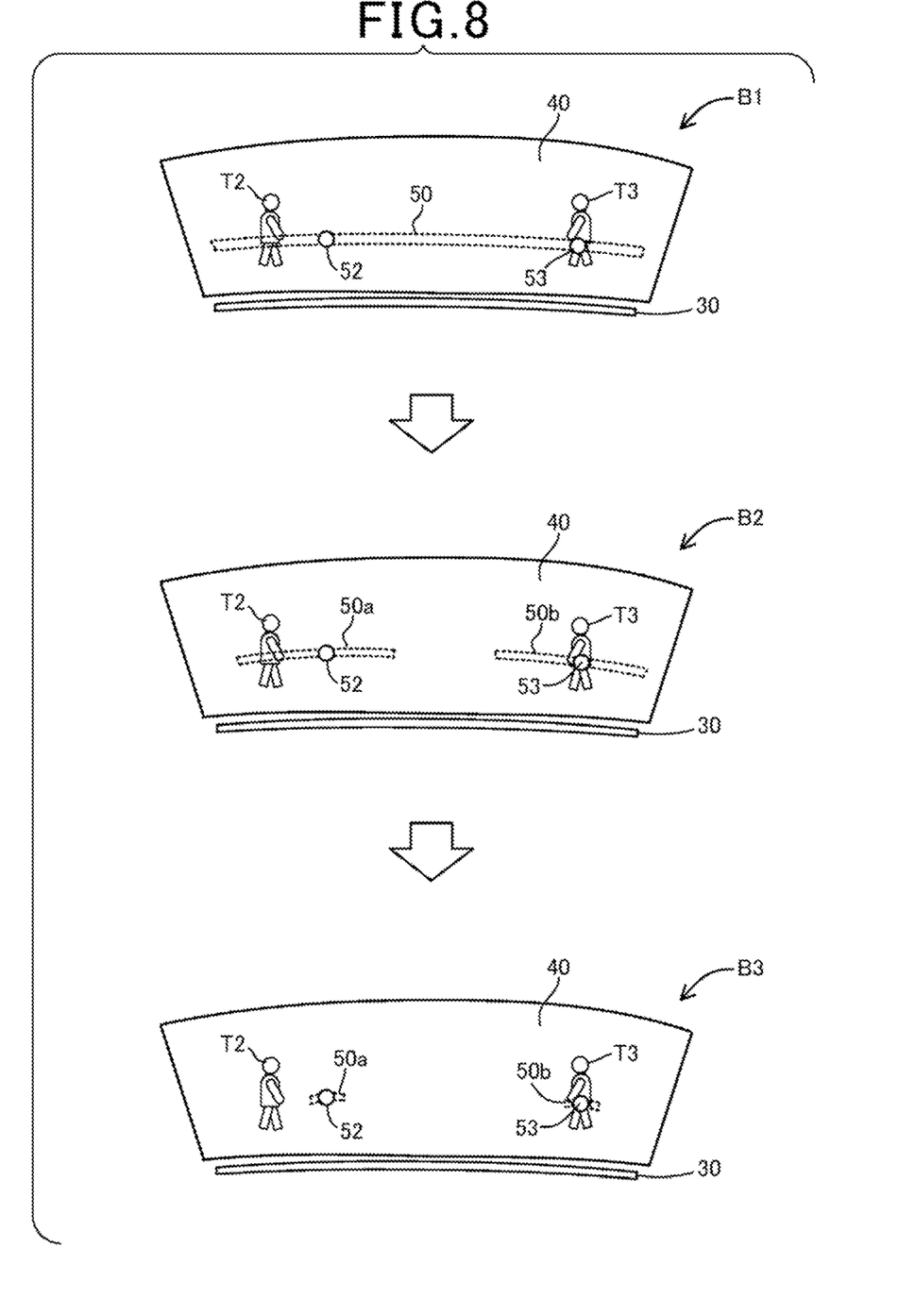
FIG. 8 is an explanatory diagram of processing for gradually shortening the length of the alert display, when two target objects present in front of the vehicle are recognized.

Furthermore, FIG. 8 illustrates an example of shortening processing of the length of the alert display 50 executed by the display control unit 12 when two target objects T2 and T3 are recognized by the target object recognition unit 11. In B1 to B3 of FIG. 8, illustrated are a position 52 at which the direction from the deriver P to the target object T2 intersects with the front window 40 and a position 53 at which the direction from the deriver P to the target object T3 intersects with the front window 40.

As illustrated in B2 and B3 of FIG. 8, the display control unit 12 divides the alert display 50 into two, and gradually shortens the length of the alert display 50a on the left side toward the position 52. Furthermore, the display control unit 12 gradually shortens the length of the alert display 50b on the right side toward the position 53. Thereby, it is expected to have an effect of guiding the line-of-sight of the driver P toward the directions of the target objects T2 and T3.

Furthermore, the sound image localization control unit 13 executes the processing of Steps S30 and S31 at the same timing as that of the processing of Steps S22 and S24 executed by the display control unit 12. In Step S30, the sound image localization control unit 13 changes the alert sound in accordance with the influence degree of the target object, and advances the processing to Step S25. In that case, the sound image localization control unit 13 outputs the alert sound with a still higher notification effect as the level of the influence degree of the target object becomes higher. For example, the sound image localization control unit 13 may output an alert sound by superimposing a prescribed attribute sound (onomatopoeia of engine sound or the like) on the alert sound that is started to be output in Step S1 of FIG. 4.

Figure 9:
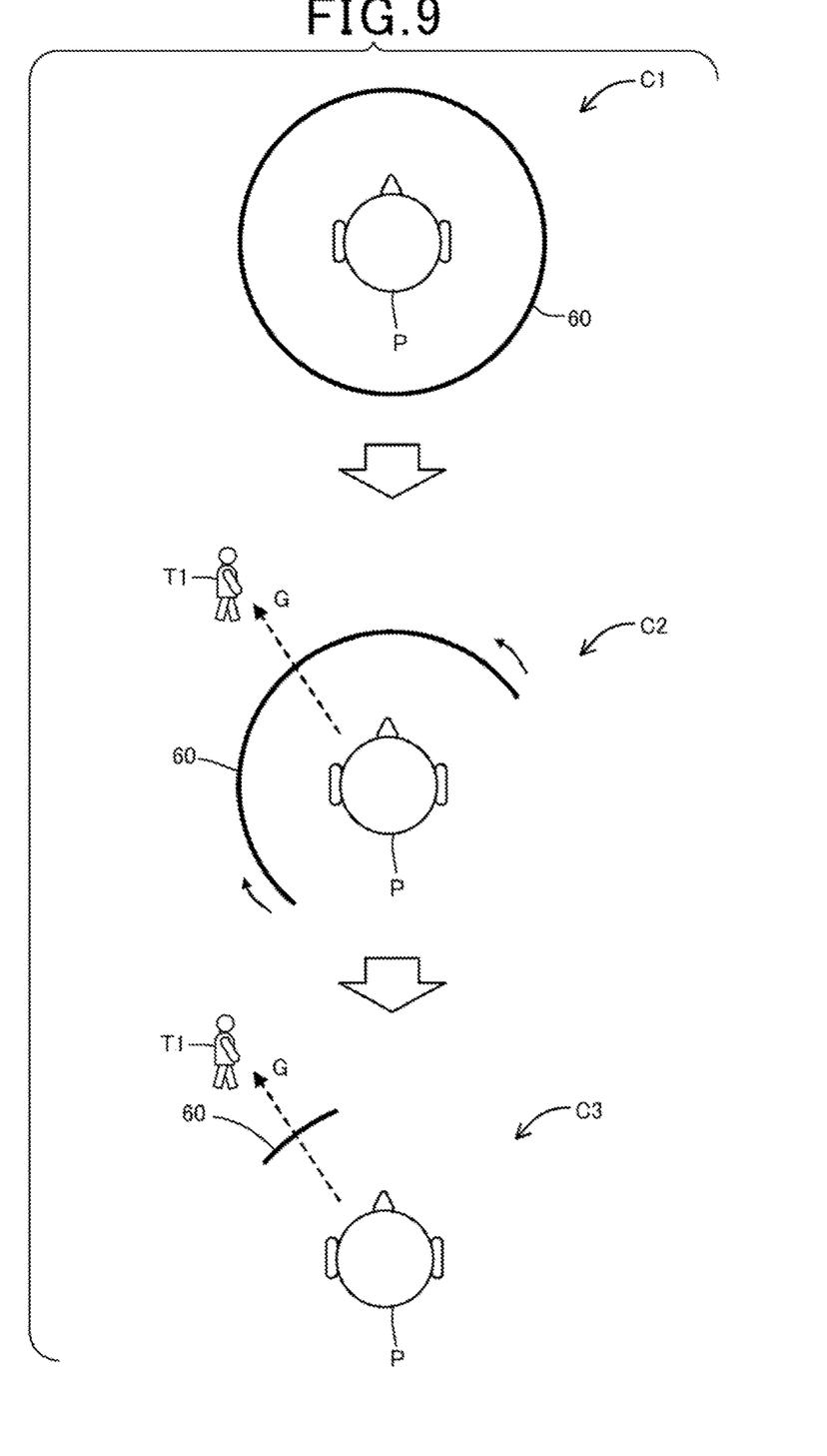
FIG. 9 is an explanatory diagram of processing for displacing a sound image position of an alert sound, when a single target object present in front of the vehicle is recognized.

In a next Step S31, the sound image localization control unit 13 gradually reduces the range of the sound image position 60 of the alert sound from the whole surroundings of the driver P illustrated in C1 toward the direction G that is from the driver P toward the target object T1 as illustrated in C2 and C3 of FIG. 9. This provides a state where the driver P perceives the alert sound only from the direction of the target object, so that it is expected that the attention of the driver P is directed toward the target object.

Figure 10:
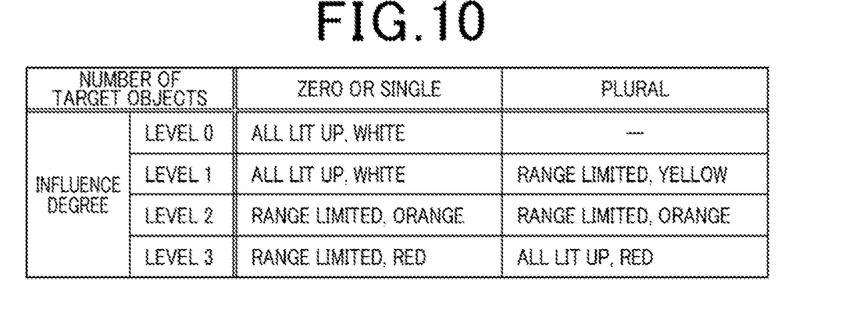
FIG. 10 is a setting table of the alert display corresponding to the level of the influence degree of the target object.

In Step 40 of FIG. 6, the display control unit 12 outputs the alert display 50 corresponding to level 1 according to the setting table of the alert display illustrated in FIG. 10. That is, the display control unit 12 turns on all light sources of the projection device 30 to output the alert display 50 throughout the whole range. By the following Steps S41 and S42, the sound image localization control unit 13 outputs the alert sound in accordance with the influence degree of the target object as in Steps S30 and S31 of FIG. 5 described above, and displaces the range of the sound image position 60 of the alert sound toward the direction from the driver P to the target object. Then, the sound image localization control unit 13 advances the processing to Step S25 of FIG. 5.

In Step S50 of FIG. 6, the display control unit 12 causes the projection device 30 to output a red alert display throughout the whole range in accordance with level 3 according to the setting table of the alert display illustrated in FIG. 10, and advances the processing to Step S25 of FIG. 5. This makes it possible to encourage the driver P to pay attention to a plurality of target objects present in front of the vehicle 100.

3. Another Embodiment

In the embodiment above, as the alert processing for the driver P, executed are the processing of gradually shortening the length of the alert display 50 by the display control unit 12 and the processing of gradually reducing the range of the sound image position of the alert sound by the sound image localization control unit 13. As another embodiment, the sound image localization control unit 13 may be omitted, and only the processing of gradually shortening the length of the alert display 50 by the display control unit 12 may be performed.

While the four-wheeled vehicle 100 is described in the embodiment above as a mobile body of the present disclosure, the mobile body of the present disclosure may simply be defined to be a mobile body operated by an operator, such as a two-wheeled vehicle, a flying object, a boat, or the like, for example.

In the embodiment above, the display control unit 12 changes the display mode of the alert display in accordance with the influence degree of the target object recognized by the influence degree recognition unit 14 according to the setting table of the alert display illustrated in FIG. 10. As another embodiment, it is possible to employ a configuration in which the influence degree recognition unit 14 is omitted, and the processing of changing the display mode of the alert display in accordance with the influence degree of the target object is not performed.

In the embodiment above, when a state where no target object is recognized by the target object recognition unit 11 continues for a prescribed time or more, the display control unit 12 switches the alert display 50 to blinking display by the processing of Steps S5 to S9 illustrated in FIG. 4. As another configuration, it is also possible to switch to a display mode other than the blinking display. For example, the display mode of the alert display 50 may be switched by changing the brightness, changing the color, or the like. Furthermore, the processing of Steps S5 to S9 illustrated in FIG. 4 may be omitted.

Note that FIG. 1 is a schematic diagram illustrating the configuration of the alert system 1 by sectioning it in accordance with the main processing contents in order to facilitate understanding of the present invention, and the configuration of the alert system 1 may also be formed by other sectioned blocks. Furthermore, the processing of each structural element may be executed by a single hardware unit or may be executed by a plurality of hardware units. Moreover, the processing of each structural element illustrated in FIG. 4 to FIG. 6 may be executed by a single program or may be executed by a plurality of programs.

4. Configuration Supported by the Embodiments

The above-described embodiments are specific examples of the following items.

(Item 1) An alert system including: a projection device configured to output, on a front window of a mobile body, a visual display viewable to an operator of the mobile body; a display control unit configured to cause the projection device to output a prescribed alert display on the front window as the visual display; and a target object recognition unit configured to recognize a target object present in front of the mobile body, in which the display control unit: when the target object is not recognized by the target object recognition unit, causes the projection device to output, on the front window, the alert display in a linear form having a prescribed length corresponding to a width of the front window along a width direction of the mobile body; and when a state changes from a state where the target object is not recognized by the target object recognition unit to a state where the target object is recognized by the target object recognition unit, causes the projection device to output the alert display on the front window such that the length of the alert display is gradually shortened toward a position where a direction from the operator to the target object intersects with the front window.

According to the alert system of item 1, it is possible to support the operator to promptly pay attention to the target object.

(Item 2) The alert system according to item 1, in which, when the state where the target object is not recognized by the target object recognition unit continues for a prescribed time or more, the display control unit changes an output mode of the alert display formed by the projection device.

According to the alert system of item 2, when the state where the target object is not recognized by the target object recognition unit continues for the prescribed time or more, it is possible to encourage the operator to expand the caution range by not considering it as safe.

(Item 3) The alert system according to item 1 or 2, including an influence degree recognition unit configured to recognize an influence degree of the target object for the mobile body when the target object is recognized by the target object recognition unit, in which the display control unit sets an output mode of the alert display formed by the projection device in accordance with the influence degree.

According to the alert system of item 3, it is possible to notify the operator of the influence degree of the target object for the mobile body using the difference in the display modes of the alert display.

(Item 4) The alert system according to any one of items 1 to 3, including a sound image localization control unit configured to change a sound image position of a prescribed alert sound perceived by the operator by controlling an output mode of a plurality of speakers provided to the mobile body, in which the sound image localization control unit: when the target object is not recognized by the target object recognition unit, sets the sound image position of the alert sound to a prescribed range of surroundings of the operator; and when a state changes from a state where the target object is not recognized by the target object recognition unit to a state where the target object is recognized by the target object recognition unit, gradually reduces the range of the sound image position of the alert sound from the prescribed range toward the direction from the operator to the target object.

According to the alert system of item 4, it is possible to increase the effect of directing the attention of the operator toward the target object by gradually reducing the range of the sound image position of the alert sound toward the direction from the operator to the target object.

(Item 5) A non-transitory recording medium storing a control program for causing a computer to execute processing of: acquiring a recognition result of a target object recognition unit that recognizes a target object present in front of a mobile body; outputting a command to a projection device to display, on a front window of the mobile body, a prescribed alert display corresponding to the recognition result as a visual display, the projection device outputting the visual display viewable to an operator of the mobile body; when the target object is not recognized by the target object recognition unit, outputting a command to the projection device to display the alert display in a linear form having a prescribed length corresponding to a width of the front window along a width direction of the mobile body; and when a state changes from a state where the target object is not recognized by the target object recognition unit to a state where the target object is recognized by the target object recognition unit, outputting a command to the projection device to display the alert display such that the length of the alert display in the linear form is gradually shortened from the prescribed length toward a position where a direction from the operator to the target object intersects with the front window.

By causing the computer to execute the control program of item 5, it is possible to achieve the same operation effect as that of the alert system of item 1.

REFERENCE SIGNS LIST

1 Alert system
2 Controller
10 Processor
11 Target object recognition unit
12 Display control unit
13 Sound image localization control unit
14 Influence degree recognition unit
20 Memory
21 Control program
30 Projection device
31 Front camera
32 Radar
33a to 33d Speaker
40 Front window
50 Alert display
60 Sound image position of alert sound
P Driver (operator)
T1 to T3 Target object

What is claimed is:

1. An alert system comprising:
a projection device configured to output, on a front window of a mobile body, a visual display viewable to an operator of the mobile body, wherein the projection device comprises a plurality of light sources; and
a processor configured to function as:
a display control unit configured to cause the projection device to output a prescribed alert display on the front window as the visual display;
a target object recognition unit configured to recognize a target object present in front of the mobile body; and
a sound image localization control unit configured to change a sound image position of a prescribed alert sound perceived by the operator by controlling an output mode of a plurality of speakers provided to the mobile body, wherein
the display control unit:
when the target object is not recognized by the target object recognition unit, causes the projection device to output, on the front window, the alert display in a linear form having a prescribed length corresponding to a width of the front window along a width direction of the mobile body; and
when a state changes from a state where the target object is not recognized by the target object recognition unit to a state where the target object is recognized by the target object recognition unit, causes the projection device to output the alert display on the front window such that the length of the alert display is gradually shortened toward a position where a direction from the operator to the target object intersects with the front window,
the sound image localization control unit:
when the target object is not recognized by the target object recognition unit, sets the sound image position of the alert sound to a prescribed range of surroundings of the operator; and
when a state changes from a state where the target object is not recognized by the target object recognition unit to a state where the target object is recognized by the target object recognition unit, gradually reduces the range of the sound image position of the alert sound from the prescribed range toward the direction from the operator to the target object.

2. The alert system according to claim 1, wherein, when the state where the target object is not recognized by the target object recognition unit continues for a prescribed time or more, the display control unit changes an output mode of the alert display formed by the projection device.

3. The alert system according to claim 1, wherein the processor is further configured to function as an influence degree recognition unit configured to recognize an influence degree of the target object for the mobile body when the target object is recognized by the target object recognition unit, and
the display control unit sets an output mode of the alert display formed by the projection device in accordance with the influence degree.

4. A non-transitory recording medium storing a control program for causing a computer to execute processing of:
acquiring a recognition result of a target object present in front of a mobile body;
outputting a command to a projection device to display, on a front window of the mobile body, a prescribed alert display corresponding to the recognition result as a visual display, the projection device outputting the visual display viewable to an operator of the mobile body, wherein the projection device comprises a plurality of light sources; and
changing a sound image position of a prescribed alert sound perceived by the operator by controlling an output mode of a plurality of speakers provided to the mobile body, when the target object is not recognized, outputting a command to the projection device to display the alert display in a linear form having a prescribed length corresponding to a width of the front window along a width direction of the mobile body;

when a state changes from a state where the target object is not recognized to a state where the target object is recognized, outputting a command to the projection device to display the alert display such that the length of the alert display in the linear form is gradually shortened from the prescribed length toward a position where a direction from the operator to the target object intersects with the front window;

when the target object is not recognized, setting the sound image position of the alert sound to a prescribed range of surroundings of the operator; and when a state changes from a state where the target object is not recognized to a state where the target object is recognized, gradually reducing the range of the sound image position of the alert sound from the prescribed range toward the direction from the operator to the target object.

* * * * *